United States Patent
Frank et al.

(10) Patent No.: US 8,707,539 B2
(45) Date of Patent: Apr. 29, 2014

(54) GUN RIVET

(75) Inventors: Uwe Frank, Windischenbach (DE); Marcel Strobel, Bretzfeld (DE)

(73) Assignee: Wurth International AG, Chur (CH)

( * ) Notice: Subject to any disclaimer, the term of this patent is extended or adjusted under 35 U.S.C. 154(b) by 1109 days.

(21) Appl. No.: 12/278,809

(22) PCT Filed: Feb. 12, 2007

(86) PCT No.: PCT/EP2007/001153
§ 371 (c)(1),
(2), (4) Date: Nov. 13, 2008

(87) PCT Pub. No.: WO2007/090682
PCT Pub. Date: Aug. 16, 2007

(65) Prior Publication Data
US 2009/0217505 A1    Sep. 3, 2009

(30) Foreign Application Priority Data

Feb. 12, 2006 (DE) .......... 10 2006 007 706
Feb. 12, 2006 (DE) .......... 10 2006 007 708

(51) Int. Cl.
*B21J 15/02* (2006.01)
*B23P 11/00* (2006.01)
*F16B 31/00* (2006.01)

(52) U.S. Cl.
USPC ........ 29/525.06; 29/432.2; 29/524.1; 29/798; 29/243.55; 29/243.53; 411/34

(58) Field of Classification Search
USPC ........... 29/432.2, 798, 524.1, 525.06, 525.05, 29/243.522, 243.529, 243.53, 34 B; 411/15, 29, 501, 38, 69, 70, 386, 34
See application file for complete search history.

(56) References Cited

U.S. PATENT DOCUMENTS

| | | | |
|---|---|---|---|
| 2,188,422 A * | 1/1940 | Waner | 411/34 |
| 2,994,243 A | 8/1961 | Langstroth | |
| 3,044,340 A | 7/1962 | Luhm | |
| 3,178,989 A | 4/1965 | Siebol | |
| 3,487,745 A | 1/1970 | Brunelle | |

(Continued)

FOREIGN PATENT DOCUMENTS

| | | |
|---|---|---|
| AU | 5 418 54 | 12/1980 |
| DE | 1673387 | 3/1954 |

(Continued)

*Primary Examiner* — Essama Omgba
(74) *Attorney, Agent, or Firm* — Boyle Fredrickson, S.C.

(57) ABSTRACT

A gun rivet and a device for placing said rivet are disclosed. The gun rivet contains a rivet head (1) with a collar (3) at one end and a rivet tip (6) at the other. The rivet body contains a cavity (7) in the form of a bore in a sleeve section (22). As with other gun rivets, the gun rivet is shot with a percussive-type action and with the aid of its rivet tip into an opening in two sheets (13, 14) that are to be joined together, until the collar comes to rest on the upper face of the upper sheet. A tensile bolt is then introduced into the cavity and is connected to the base (8) of the latter. This can be achieved by resistance welding. The tensile bolt is then drawn until a rivet head is formed on the opposite side of the two sheets. The tensile bolt is then detached from the gun rivet, for example by shearing. The tensile bolt can be re-used to place another rivet.

5 Claims, 4 Drawing Sheets

(56) References Cited

U.S. PATENT DOCUMENTS

Figure 7:
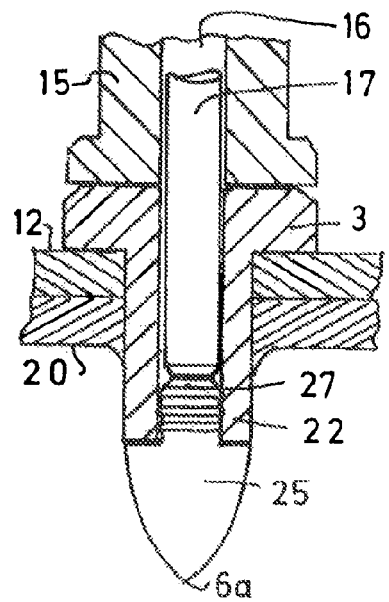

| | | | |
|---|---|---|---|
| 3,691,924 A | | 9/1972 | Baker |
| 4,036,098 A | | 7/1977 | Schruff |
| 4,089,099 A | | 5/1978 | Nivet |
| 4,218,953 A | * | 8/1980 | Haytayan ........................ 411/29 |
| 4,872,332 A | | 10/1989 | Potzas |
| 4,987,714 A | | 1/1991 | Lemke |
| 5,066,446 A | * | 11/1991 | Phillips, II .................... 264/242 |
| 5,201,623 A | | 4/1993 | Benedetti et al. |
| 5,403,135 A | * | 4/1995 | Renner et al. .................... 411/34 |
| 5,469,610 A | * | 11/1995 | Courian et al. ........... 29/243.521 |
| 5,511,298 A | * | 4/1996 | Gasser ..................... 29/243.526 |
| 5,815,906 A | * | 10/1998 | Johnsen ............................. 29/524.1 |
| 6,319,258 B1 | | 11/2001 | McAllen, III et al. |
| 6,487,767 B1 | | 12/2002 | Reid et al. |
| 6,834,420 B1 | | 12/2004 | Röthe et al. |
| 6,862,864 B2 | | 3/2005 | O'Banion et al. |
| 7,040,006 B2 | * | 5/2006 | Mauer et al. .................... 29/716 |
| 7,077,609 B2 | * | 7/2006 | Wirth et al. ..................... 411/43 |
| 7,341,413 B2 | * | 3/2008 | Morris et al. ................... 411/29 |
| 7,596,858 B2 | * | 10/2009 | Opper ............................. 29/716 |
| RE41,258 E | * | 4/2010 | Mauer et al. ..................... 29/716 |
| 7,966,705 B2 | * | 6/2011 | Morris et al. ............. 29/243.521 |
| 2004/0047704 A1 | * | 3/2004 | Wirth et al. ..................... 411/43 |
| 2004/0107557 A1 | | 6/2004 | Morris et al. |
| 2004/0162151 A1 | * | 8/2004 | Mauer et al. ................. 470/209 |
| 2004/0247412 A1 | | 12/2004 | Reck et al. |
| 2005/0111934 A1 | | 5/2005 | Ladouceur |
| 2006/0248705 A1 | * | 11/2006 | Opper ........................ 29/525.06 |
| 2006/0251495 A1 | * | 11/2006 | Opper ........................... 411/501 |
| 2008/0178454 A1 | * | 7/2008 | Morris et al. ................ 29/432.2 |
| 2009/0217507 A1 | * | 9/2009 | Frank et al. ................ 29/525.06 |

FOREIGN PATENT DOCUMENTS

| | | | | |
|---|---|---|---|---|
| DE | 1678410 | | 6/1954 | |
| DE | 1719606 | | 12/1955 | |
| DE | 960851 | | 3/1957 | |
| DE | 1437477 | | 3/1966 | |
| DE | 1750560 | | 3/1971 | |
| DE | 2013387 | | 10/1971 | |
| DE | 7326244 | | 11/1973 | |
| DE | 25 40 692 A1 | | 3/1977 | |
| DE | 28 11 770 A1 | | 9/1978 | |
| DE | 2926940 | | 1/1981 | |
| DE | 3228189 | | 1/1984 | |
| DE | 35 44 423 A1 | | 6/1987 | |
| DE | 40 08 829 A1 | | 9/1991 | |
| DE | 44 32 956 A1 | | 3/1995 | |
| DE | 44 36 824 C1 | | 4/1996 | |
| DE | 699 17 827 T2 | | 7/2005 | |
| DE | 102006007706 A1 | * | 8/2007 | ............. F16B 19/10 |
| EP | 0 320 953 A2 | | 6/1989 | |
| EP | 0 936 362 A2 | | 8/1999 | |
| EP | 1 402 974 A1 | | 3/2004 | |
| EP | 1396646 A1 | * | 3/2004 | ............. B21J 15/02 |
| FR | 2103214 | | 4/1972 | |
| GB | 547 967 | | 9/1942 | |
| GB | 645903 A | | 11/1950 | |
| GB | 2 415 759 A | | 1/2006 | |
| JP | 50-60659 A1 | | 5/1975 | |
| WO | 2004/102015 A1 | | 11/2004 | |

\* cited by examiner

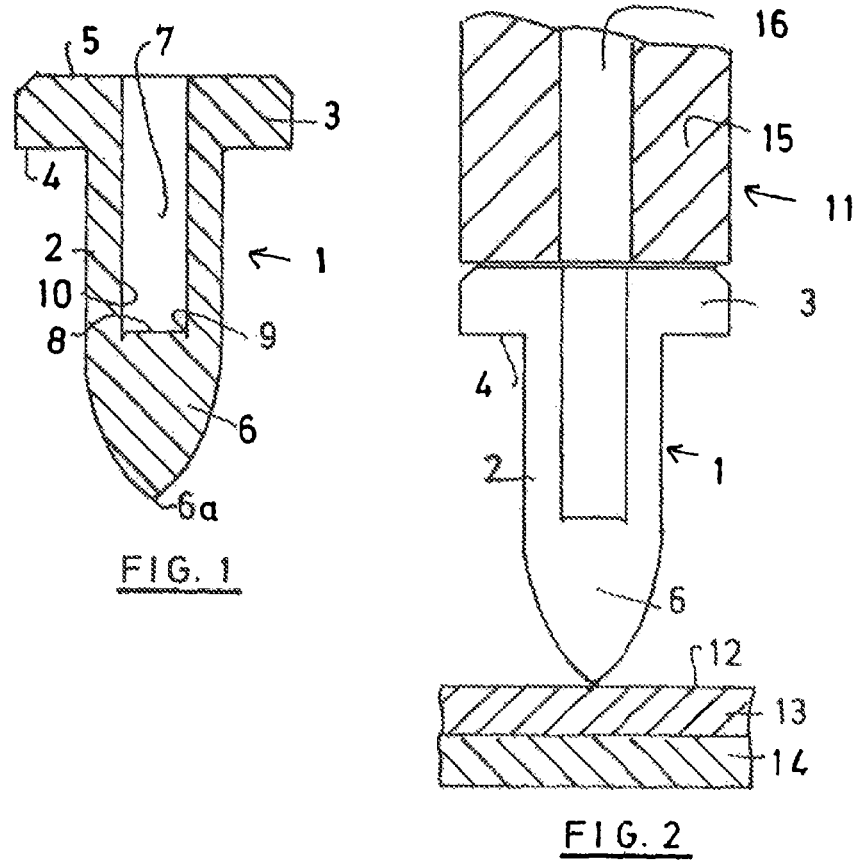
FIG. 1
FIG. 2
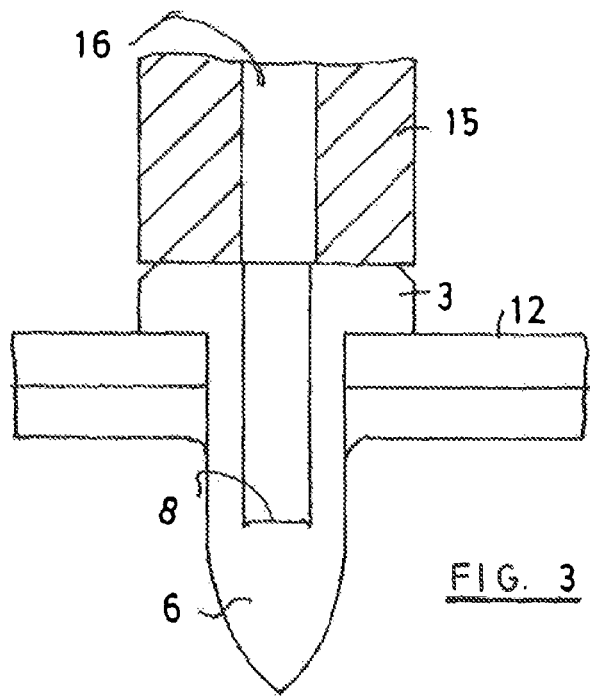
FIG. 3

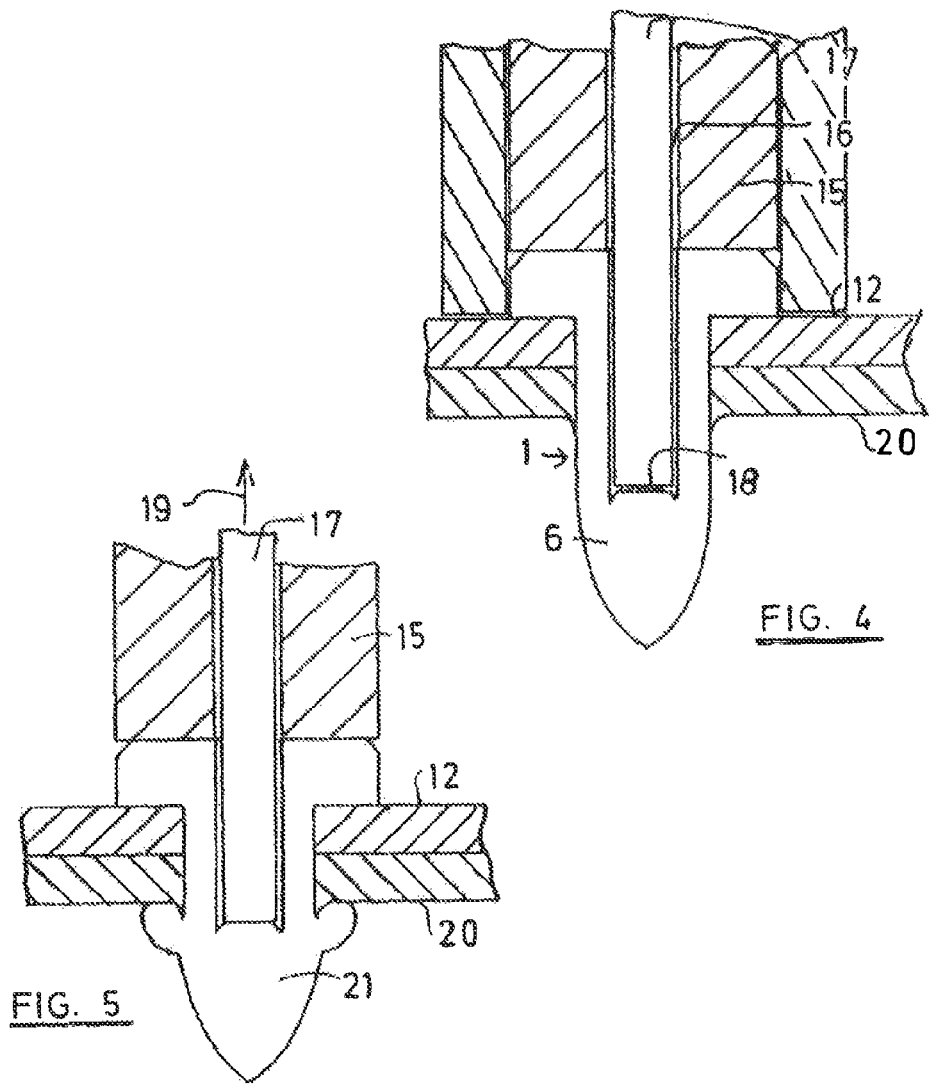
FIG. 4
FIG. 5
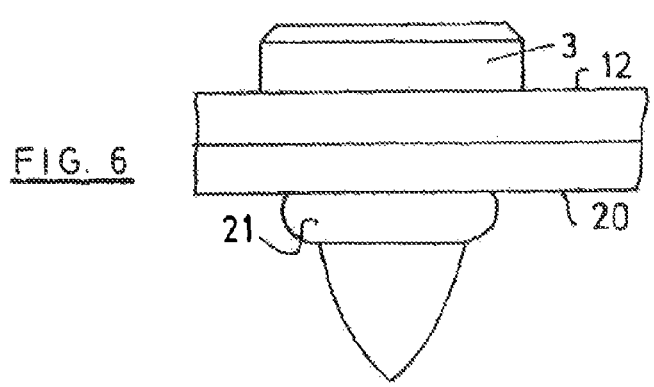
FIG. 6

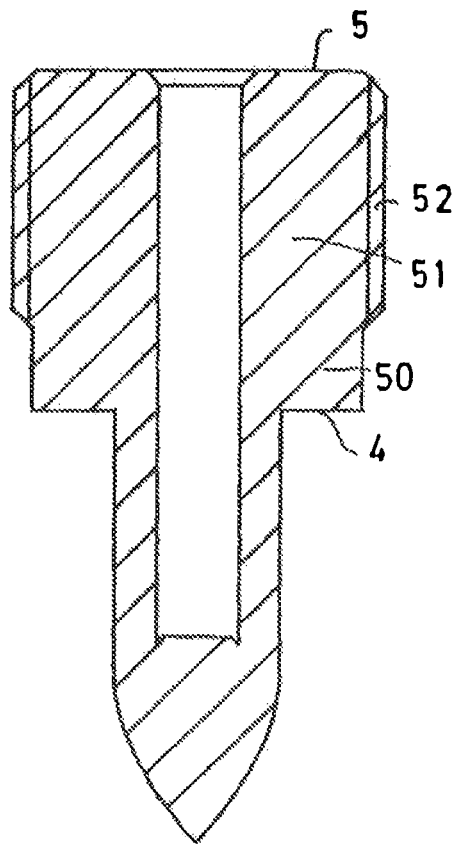
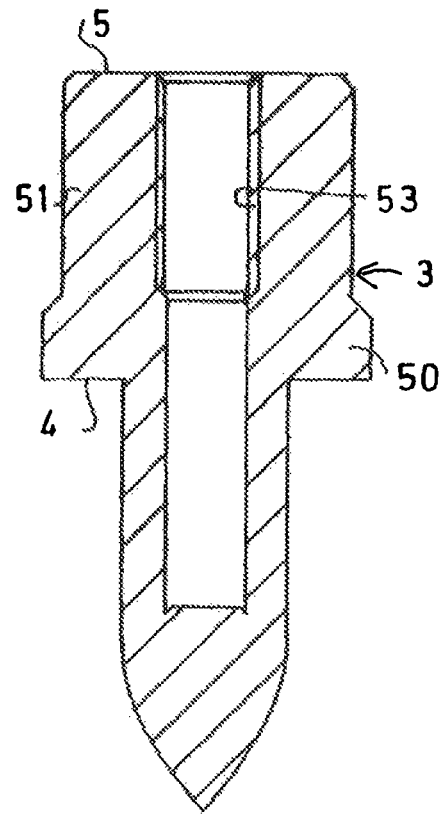
FIG. 9                FIG. 10
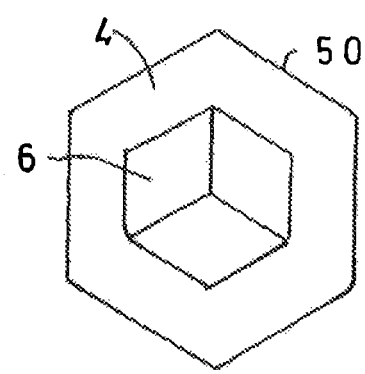
FIG. 11

GUN RIVET

The invention relates to a blind rivet configured in the form of a gun rivet and a device and a method for setting said rivet.

Blind rivets have long been known. They are used for fastening together two components by a riveting operation, where access to the rear surface of the components involved is not required. Blind rivets are thus particularly suitable for use whenever the rear surface of the components to be fastened together is inaccessible. Common types of blind rivets require that the components to be fastened together be provided with holes, through which the rivet body is inserted. A riveting mandrel that deforms the far ends of rivets may then be drawn outward from their upper surface in order to form a rivet head.

Configuring the tip of the mandrel that protrudes from the rivet's far end in the form of an autodrilling tip in order that drilling procedures utilising a suitable tool may be performed in conjunction with a single operation that includes the riveting operation is already known.

Configuring blind rivets in the form of gun rivets in order that they may be shot into the components to be fastened together by a rivet gun, without predrilling holes therein, has also been known for some time. As in the case of other blind rivets, for those known gun rivets, a riveting mandrel extending through the rivet body must be drawn following setting in order to effect the actual riveting operation. That relatively long mandrel, which is gripped by a tool for drawing it, is subsequently either discarded or drops off in the vicinity of the location where the riveting was performed.

Also known are bucked rivets, where a mandrel with a pointed tip, whose other, blunt end protrudes from the upper surface of the collar, is inserted into a bore in a rivet body. Such rivets are driven in by a hammer blow, where the hammer's head strikes the protruding end of the mandrel. However, that hammer blow is incapable of accurately splitting the forces involved into an initial, exclusively driving force that is then followed by a bucking force (cf. U.S. Pat. No. 3,691,924).

The invention is based on the problem of extending the benefits of blind rivets such that concluded riveting operations yield no waste that must be disposed of separately.

The gun rivet proposed by the invention is configured similarly to a known gun rivet, except that it has no mandrel that may be drawn by a tool. Instead of a mandrel, inside the rivet body there is, for example, a protuberance on that end of the rivet sleeve opposite the collar that makes that sort of deformation possible. That protuberance may be obtained by incorporating predefined buckling points, longitudinal slots, or similar. The tool employed for setting the gun rivet then directly engages that portion of the rivet body.

For example, under an elaboration on the invention, the central engagement point might be formed on the base of a hole in the rivet body. In order to confine the deformation to that side of, for example, two pieces of sheet metal that are to be fastened together, opposite the rivet body's collar, it will be sensible if the hole in the rivet body is configured in the form of a bore whose depth is such that it terminates at a location falling roughly between the rivet sleeve and rivet tip.

Under an elaboration on the invention, it may be provided that the engagement point is formed on a tapered section of a hole in the rivet body. Such a tapered section might form an enlarged engagement surface for the drawing tool.

In particular, it may be provided that the central engagement point is configured for being rigidly joined to a tie bolt, which may be accomplished by, for example, having the engagement point form a surface orthogonal to the longitudinal axis, to which a tie bolt may be either resistance welded or cold-welded.

The rivet tip, which creates the holes in the pieces of sheet metal to be fastened together, may, in particular, be a monolithic, integral part of the rivet body.

Having the rivet tip be a separate component joined to the rivet body is, however, also feasible and covered by the invention. Since the rivet tip is forced up against the rivet body during creation of the rivet head, under some circumstances, no more-stringent requirements need be imposed on the joint joining the rivet head to the rivet body, if the manner in which the tie bolt is attached thereto will allow same.

If the rivet tip is a separate component, it may, for example, have an annular surface for abutting against the rivet body on that end that faces toward the rivet body, within which a central extension that engages the hole in the rivet body, where it, for example, forms an interference fit therewith or is held in place by friction, is formed on the rivet tip.

It may, for example, be provided that the rivet tip is fabricated from a different material than the rivet body, or from a material that has been treated differently than that from which the rivet body is fabricated.

Depending upon the manner in which the tie bolt is joined to the gun rivet, it may be beneficial if the outer perimeter of the cross-section of the sleeve section of the rivet body has a noncircular contour. The planar underside of the rivet body's collar might also have prongs or other sharp-edged protrusions that will prevent the rivet body from rotating relative to the pieces of sheet metal that it fastens together.

The invention also proposes a method for setting blind rivets. Under that method, a gun rivet provided with a rivet tip is abruptly inserted into, for example, shot into, a component until its collar abuts against the component's upper surface. Simultaneously, or subsequently, a tie bolt is introduced into a recess in the rivet body that has the shape of a bore until it contacts the rivet body, in particular, in the vicinity of the end of the recess, where the tie bolt is joined to the rivet body. The tie bolt is then withdrawn from the recess, which will cause the forward section of the rivet body to deform, thereby increasing its diameter. If its forward section protrudes from the far side of the component, its forward section will be deformed into a rivet head. The tie bolt will be released from the rivet body as soon as the deformation has been achieved or the rivet head formed. The tie bolt may be reused for setting the next gun rivet.

The tie bolt is part of a tool that may be used for setting gun rivets.

The joint between the tie bolt and the gun rivet may be generated by, for example, cold-welding. The tie bolt may be set in rotation while it is in contact with an engagement point on the rivet body, which might cause the cold-welding, for that purpose.

Another means for joining the rivet body and tie bolt is resistance welding or capacitor-discharge welding them together. A current source might be arranged in a setting tool for that purpose, in which case, it would be sensible if the tie bolt were insulated from the gun rivet in the vicinity of its outer surface and only its near end were exposed.

Yet another means for generating that joint involves the tie bolt having a self-drilling tip in the vicinity of its far end and screwing itself into the far end of the hole in the rivet body. The tie bolt might be set in a rotary motion, which will be reversed in order to unscrew its self-drilling tip from the rivet body following drawing, for that purpose.

It will be sensible if the tie bolt's drawing motion is braced against the rivet body's collar, which is intended to provide that the tensile force exerted will not affect the joint between the rivet body and sheet metal. That may be achieved by, for example, providing that the tensile force is generated in a tool and acts between a mating component and the tie bolt.

The invention also proposes a device for setting gun rivets that incorporates a holder for holding a gun rivet and an advancing body having a tubular shape, at least at its forward section, that may be abruptly advanced by a drive. That abrupt advance shoots the gun rivet into the two pieces of sheet metal. The device also incorporates a tie bolt that may be advanced into a recess in the gun rivet by a drive until it contacts a mating surface therein. That advance need not be abrupt. A joining device is also provided in order to join the far end of the tie bolt to the end of the recess in the rivet body. The drive for the tie bolt is configured such that it is capable of exerting a large force on the tie bolt once that joint has been created, where that force is exerted on the advancing body, which abuts against the upper surface of the collar.

The device also incorporates a device for separating the tie bolt from the rivet body once it has been withdrawn therefrom, which may be achieved by, for example, suitably dimensioning the tie bolt's far end. If its surface area is sufficiently small, although the joint might be strong enough for deforming the gun rivet, it might not be strong enough to withstand further drawing, in which case, the joint will simply break.

Another means for separating the joint might be rotating the tie bolt, which could cause the joint to shear off.

Cold-welding, resistance welding, or screwing it in with the aid of a self-drilling tip might be provided as means for generating the joint.

Figure 8:
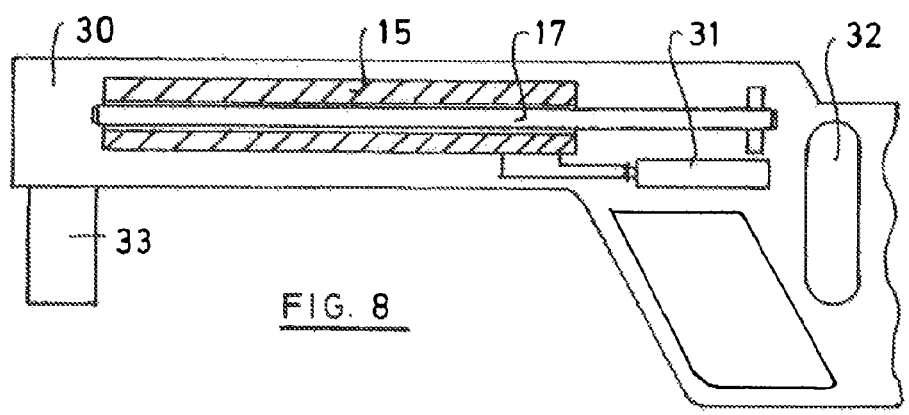

Further features, details, and benefits of the invention arise from the claims and the abstract, the wording of both of which is herewith made an integral part of the content of the description by way of reference thereto, the following description of a preferred embodiment of the invention, and the drawings, which depict:

FIG. 1 a longitudinally sectioned view of a gun rivet according to the invention;

FIG. 2 a schematic view of the situation at the commencement of the setting operation;

FIG. 3 the status following emplacement of the rivet body, prior to formation of the rivet head;

FIG. 4 the introduction of a tie bolt;

FIG. 5 the status following formation of the rivet head by means of a drawing procedure;

FIG. 6 a side view of the results of the setting operation;

FIG. 7 a view, corresponding to that of FIG. 4, of a modified embodiment;

FIG. 8 a schematic view of a device for setting gun rivets according to the invention;

FIG. 9 an axially sectioned view of a gun rivet having an external thread on its collar;

FIG. 10 an axially sectioned view of a gun rivet having an internal thread on its bore;

FIG. 11 a view of a gun rivet, as viewed from its tip.

FIG. 1 depicts a longitudinally sectioned view of a gun rivet according to the invention. The gun rivet incorporates a rivet body 1 whose centre section is configured in the form of a rivet sleeve 2. A collar 3 having a planar bounding surface on its underside 4 is formed on one end of the rivet body 1. Its underside is that side thereof that faces the rivet tip 6. An engagement surface for a setting tool is formed on the surface 5 opposite its underside 4, which is also planar, or nearly planar.

The rivet tip 6 is configured on that end opposite the collar 3 by continually diminishing the cross-section of the rivet body until it becomes a true point 6a. A recess 7 that has the shape of a bore, that is, has a cylindrical cross-section, is configured within the rivet body 1. The recess 7 terminates in a base 8 that is separated from the wall 10 of the recess 7 by a circumferential groove 9.

Setting of the gun rivets proceeds such that the gun rivet is arranged in a holder of a tool. The relationship between a part of the setting tool 11 and the rivet body 1 is depicted in FIG. 2. The gun rivet is positioned such that point 6a on the rivet tip 6 comes to rest on the upper surface 12 of two overlain pieces of sheet metal 13, 14. Those two pieces of sheet metal 13, 14 are to be fastened together by the gun rivet. A part of the setting tool 11 is set onto the top of the collar 3, i.e., that end thereof opposite the rivet sleeve 2. The part involved is an advancing body 15 that is configured in tubular form in that vicinity, i.e., has a coaxial bore 16 running along its centreline. That advancing body 15 is driven against the head of the rivet body 1 by a percussively operating, intermittent drive, and that blow drives it and its tip 6a and 6 through both pieces of sheet metal 13, 14. The result is that the underside 4 of the collar 3 abuts against the uppermost surface 12 of the two pieces of sheet metal 13, 14, where the low piece of sheet metal 14 will slightly deform around the perimeter of the rivet body. The result of this initial setting procedure, which merely drives the rivet body through the pieces of sheet metal, is depicted in FIG. 3. An abutment sleeve surrounding the advancing body (cf. FIG. 4) comes to rest on the uppermost surface of the pieces of sheet metal. Surplus energy will therefore be transported from the advancing body to the abutment sleeve in order that the collar 3 of the gun rivet will have to absorb little energy when it has been firmly seated.

Under a second operating procedure, a tie bolt 17 that has an outer diameter slightly less than the diameter of the bore 16 is then inserted through the bore 16 in the advancing body 15. The tie bolt is advanced until it abuts against the base 8 of the recess 7 in the rivet body 1, where a joint 18 is generated employing, for example, resistance welding. The tie bolt 17 is insulated all along its outer surface, and only its tip is exposed, for that purpose. One terminal of the voltage source is, for example, connected to the metallic rivet body 1 via the advancing body 15, and the other terminal of the voltage source is connected to the tie bolt 17. The welded joint 18 will be generated as soon as the tie bolt 17 contacts the base 8 of the recess 7.

The tie bolt is then drawn outward through the advancing body 15, as indicated by the arrow 19 in FIG. 5. That drawing procedure will the draw the rivet tip 6 up against the two pieces of sheet metal 13, 14, whereby the rivet sleeve 2 will deform in the vicinity between the rear surface 20 of the two pieces of sheet metal and the base 8, as would be the case for a normal blind rivet. As a result, a rivet head 21 similar to that depicted near the bottom of FIG. 5 will be formed on the backside of the two pieces of sheet metal.

The tie bolt 19 will then have to be separated from the base 8 of the recess 7, which may be accomplished by, for example, exerting a greater tensile force that will be sufficient to break the joint 18. Of course, that force must be less than the force that would destroy the rivet head 21. Another means for breaking the joint 18 involves rotating the tie bolt 17 at this point, thereby generating a shearing force that breaks the joint 18. In the latter case, it will be sensible if the rivet body 1 either has a noncircular cross-section in the vicinity of the rivet sleeve 2 or the underside 4 of the collar 3 has protrusions, prongs, or similar in order to prevent the rivet body from rotating when the tie rod is rotated.

The result will be that a riveting of the two pieces of sheet metal 13, 14, under which the collar will be on one side 12 of the two pieces of sheet metal and the rivet head 21 will be on the other side 20 thereof, has been generated. Viewed from the upper surface of the collar 3, a centred hole will be present at the riveted joint.

In the case of the embodiment described above, the rivet body 1 is a monolithic component whose rivet tip 6 is a continuation of the rivet sleeve 2. However, FIG. 7 depicts another manner in which the rivet body might be configured. In the latter case, the rivet sleeve 22 is a true sleeve having a through hole. A rivet tip 25 that is manufactured as a separated component is inserted into that end of the rivet sleeve 22 opposite the collar 3. The rivet tip 25 has a planar, annular, bounding surface 26 that matches the annular end of the rivet sleeve 22 on that end thereof opposite its point 6a. An extension 27, whose outer diameter slightly exceeds the inner diameter of the rivet sleeve 22, is formed on its centre. The rivet tip 25 may be fit into the rivet sleeve 22 in that manner, which will hold it in place therein. The joint between the tie bolt 17 and the extension 27 on the rivet tip 25 is generated in the same manner as for the case of the embodiment according to FIGS. 1-6. The extension 27 may also extend further into the rivet sleeve, even up to the gun rivet's engagement surface 5, if necessary. In this case, it will be sensible if the extension does not contact, or only lightly contacts, the wall of the rivet sleeve, since it is intended to be drawn with respect to the rivet sleeve.

FIG. 8 depicts a device for setting a gun rivet according to the method described here. The device incorporates a housing 30 that is configured similarly to, and looks like, a normal device for setting studs. The advancing body 15, which has been manufactured in accordance with, and mentioned in conjunction with, FIG. 4 is housed in the housing and mounted therein such that it is longitudinally translatable. The advancing body 15 incorporates a drive 31 that is configured such that the advancing body 15 may be driven forward in an abrupt motion relative to the housing in order to drive the gun rivet through the two pieces of sheet metal. That drive 31 may, for example, be explosively operated, for which purpose a gas cartridge 32 may be arranged in the housing 30. A mounting of the tie bolt 17, which is not shown, is installed coaxially within the advancing body 15 such that it also is longitudinally translatable. The tie bolt 17 need not be abruptly driven forward, since it need only contact the engagement point on the base of the recess 7. However, the tie bolt 17 must have a drive that retracts it under exertion of a large force, since that force must be sufficient to deform the section of the rivet body extending beyond the two pieces of sheet metal. That drive may be accomplished by, for example, exerting a screwing action thereon.

A magazine 31, in which a large number of gun rivets that may be driven by a spring in a holder situated immediately ahead of the operating end of the advancing body 15 are accommodated, is arranged on the side of the housing 30, in the vicinity of the latter's front end.

FIG. 9 depicts an axially sectioned view of another embodiment, where the collar has an extension 51 on that side thereof opposite its planar underside 4 that makes the collar 3 much thicker as a whole. An external thread 52 is formed on that section 51 thereof. The engagement surface for the setting tool is thus situated at a greater distance from its planar underside 4. The outer contour of the collar section 50 lacking an external thread may, for example, be hexagonal in order that it may be gripped by a wrench. The outer diameter of the section 51 provided with the thread 52 exceeds the outer diameter of the section 50 of the collar 3 immediately adjoining the underside 4 thereof.

Prongs, ribs, or similar that dig into the material when the gun rivet is set may be arranged on that underside 4 in order to prevent the gun rivet from rotating when the tie rod is rotated.

FIG. 10 depicts an embodiment where the overall thickness of the collar 3 also exceeds that of the embodiments according to FIGS. 1-7. In this case, once again, a section 50, on which a surface for accommodating a wrench may, once again, be formed, is formed directly on the underside 4. The adjoining section 51 has a smooth outer surface, i.e., lacks a thread. Instead, the outer surface of the bore 7, that is, the section thereof adjoining the engagement surface 5, is provided with an internal thread 53. A component may be screwed therein, or onto the external thread 52 on the embodiment according to FIG. 9, once the gun rivet has been set.

The gun rivet according to the invention, in particular, the embodiment depicted in FIGS. 9 and 10, may be utilised for more than merely fastening two components, for example, pieces of sheet metal, together. Particularly in the case of the embodiment depicted in FIGS. 9 and 10, the gun rivet may be utilised merely for fastening itself in place in order to subsequently fasten another component to the gun rivet using the devices provided. Either the external thread 52 or the internal thread 53 may be utilised for that purpose. Other options, for example, transverse holes extending through the threaded extension, bayonet extensions, or similar, are also feasible.

Expanding the forward section of gun rivets onto the rear surface of a component to which they are to be fastened will be unnecessary whenever they may also be used for more than merely fastening two pieces of sheet metal together and may also be used for fastening themselves in place. That their expansion may also take place within the hole or bore in the component whenever the component to which they are fastened has a sufficiently large thickness is also feasible and covered by the invention. Spreading their forward section outward may also take place within a hole, even a blind hole.

Although rivets, even gun rivets, are usually configured such that they have circular cross-sections, according to the invention, it may be provided that gun rivets have other than circular cross-sections, at least in the vicinity of their tip, or even over the entire length of their rivet body. For example, FIG. 11 depicts view of a gun rivet, as viewed from its tip, where both the rivet tip 6 and the collar 50 have hexagonal shapes, where the forward section of the rivet tip has three edges that might facilitate the gun rivet's penetration into sheet metal. If the entire rivet tip has a hexagonal cross-section, that might also represent a means for securing the gun rivet against rotation.

The invention claimed is:

1. A method for setting gun rivets, wherein:
   before inserting a tie bolt into a recess, a gun rivet without threads and having a collar and a non-self-drilling rivet tip is shot into a component using a first tool that applies force to the collar and not to the tie bolt until an underside of the collar strikes an upper surface of the component,
   a tie bolt is then inserted into a recess in the gun rivet using a second tool until it abuts against a base of the gun rivet,
   next, the tie bolt is joined to the gun rivet, and is further joined to the base of the recess,
   next, the tie bolt is drawn upon using the second tool in order to deform the rivet, and
   lastly, the tie bolt is separated from the gun rivet once a forward section of the gun rivet has been expanded by the tie bolt being drawn using the second tool.

2. A method according to claim 1, wherein a cold-welding technique is employed in order to create the joint.

3. A method according to claim 1, wherein resistance welding is performed in order to create the joint.

4. A method according to claim 1, wherein capacitor-discharge welding is performed in order to create the joint.

5. A method according to claim 1, wherein the tie bolt's drawing motion is braced against the rivet body's collar, to cause a tensile force to be exerted on the gun rivet while it abuts against a mating component without affecting the joint between the rivet body and the mating component.

* * * * *